United States Patent [19]

Zoch et al.

[11] Patent Number: 5,709,497
[45] Date of Patent: Jan. 20, 1998

[54] LATCHING DEVICE

[75] Inventors: David W. Zoch, Cypress; Jimmy R. Cole, Jr., Houston, both of Tex.

[73] Assignee: Concord Technologiies Inc., Houston, Tex.

[21] Appl. No.: 666,650

[22] Filed: Jun. 18, 1996

[51] Int. Cl.$^6$ ........................................ B63G 8/14
[52] U.S. Cl. .................. 403/24; 403/321; 403/389; 24/23 B; 114/245
[58] Field of Search ................ 403/385, 49, 321, 403/323, 324, 389, 390, 338, 24; 24/23 B, 483, 484, 288, 488, 494; 285/411, 409, 420, 419; 114/245; 367/16–20; 181/110

[56] References Cited

U.S. PATENT DOCUMENTS

| | | | |
|---|---|---|---|
| 2,241,089 | 5/1941 | Hampe et al. | 285/409 |
| 2,706,648 | 4/1955 | Gosse | 403/338 X |
| 3,042,430 | 7/1962 | Guy | 285/420 X |
| 3,375,800 | 4/1968 | Cole | 114/235 |
| 3,931,608 | 1/1976 | Cole | 340/7 PC |
| 4,123,095 | 10/1978 | Stehlin | 285/411 X |
| 4,292,871 | 10/1981 | Weinhold | 285/409 X |
| 5,359,866 | 11/1994 | Boddy | 285/409 X |
| 5,404,339 | 4/1995 | Cole, Jr. | 367/16 |
| 5,529,011 | 6/1996 | Williams, Jr. | 114/245 |

*Primary Examiner*—Harry C. Kim
*Attorney, Agent, or Firm*—William A. Knox

[57] ABSTRACT

A cluster of seismic streamer cable utility modules is provided with a set of hinged latching members. The hinged latching members are adapted secure the cluster to the steamer cable by closing the hinged latches around corresponding collars mounted on the streamer cable. The collars form an inner race while the closed hinged latches form an outer race to allow free relative rotation between the streamer cable and the cluster of modules.

5 Claims, 4 Drawing Sheets

LATCHING DEVICE

BACKGROUND OF THE INVENTION

1. Field of the Invention

This invention is intended for use with seismic marine streamer cables. More specifically a simple system is disclosed for removably securing clusters of utility modules to a streamer cable.

2. Discussion of Related Art

In marine seismic exploration, a ship tows a long streamer cable at a selected depth in the water such as 15–30 meters. Typically, the streamer cable consists of a plastic tubular member two to three kilometers or more in length and about 7 centimeters in diameter. The streamer cable may house hundreds or thousands of acoustic sensors of a selected one of several types of sensors such as hydrophones. The streamer cable is rendered neutrally buoyant in the water by filling the plastic tubular member with a lightweight fluid such as odorless kerosene. When not in use, the streamer cable is stored on a huge cable reel mounted on the stern of the towing ship.

A sound source periodically generates a wavefield. The wavefield propagates along reflected and refracted trajectories in the water and through the underlying earth strata whereupon the wavefield returns to the near surface where it is detected by the hydrophones. The hydrophones convert the received acoustic wavefield to electrical signals. Signal communication channels are provided in the tubular member or cable jacket for transmitting the electrical signals, representative of the acoustic signals received by the sensors, to a seismic data-acquisition and processing system on the towing ship.

The long streamer cable is made up of a plurality of separate sections, each usually about 100 meters long. The individual sections are mechanically and electrically joined to one-another by connector modules which may include preliminary data-processing electronics. Although the long, flexible streamer cable is designed to be neutrally buoyant, it must be towed at a prescribed depth in the water and its position in three-dimensional space must be known throughout its length. To that end, a three-axis configuration-sensing and control module may be secured to each cable section or perhaps every alternate section. The module includes a magnetic compass for direction-monitoring purposes and depth-control diving planes for maintaining the cable at a desired depth.

The seismic streamer cable is very expensive. If the cable is snagged by a passing ship or becomes entangled in a marine obstruction, the towing ship cannot immediately stop and the snagged cable may be rent asunder. Accordingly, a cable-preserver device is also secured to each cable section, usually in association with the configuration monitoring module described above to form a cluster of utility modules. One such combination is disclosed in U.S. Pat. No. 5,404,339, issued Apr. 4, 1995 to Jimmy R. Cole, Jr., assigned to the assignee of this invention and which patent is incorporated herein by reference as an example of a cluster of utility modules attached to a streamer cable.

In FIG. 1 of the '339 patent, which is reproduced here as Prior-Art FIG. 1, the respective modules 12 and 14 are secured to opposite sides of rotatable rings 16 and 18 by locking cams 17 and 19. Rings 16 and 18 which may be naval bronze or titanium are permanently bolted around collars 22 and 24 by bolts, not shown. Collars such as 22 may be made of a suitable hard plastic material of any desired type. U.S. Pat. No. 3,931,608 issued Jun. 6, 1976 to Jimmy R. Cole teaches the details of a cam means for releasably securing a utility module to a rotating cable-attachment slip-ring or journal such as 16 or 18. Thus, to remove a module such as 12 or 14 from cable 20, the module must be released from the journal by unlocking the cams but the ring or journal members 16 and 18 as well as collars 22 and 24 remain behind permanently mounted on the cable.

The utility modules are on the order of 10 centimeters in diameter and more than one meter long. Because of their awkward bulk, each time the cable is retrieved for storage on the cable reel, the utility modules must be removed from the cable attachment rings. Obviously they must be reattached prior to redeployment of the cable in the water.

Each module must be fastened to two separate attachment rings, one each at their fore and aft ends. Because of the size and bulk of certain of the well-known commercially-available modules, attachment of each one of the modules to the mounting rings of the streamer cable usually requires that one person align the fore and aft locking cams on the base of a module with corresponding dove-tail slots on the fore and aft attachment rings. A second person, wielding a ½" hex wrench, then manipulates the respective locking cams on the module in question to lock the module in place. The procedure must be repeated for the second module of the cluster and for all of the clusters assigned to each of the remaining cable sections. As many as 25 to 50 modules may be involved in a single long seismic cable. That process, which is slow and unnecessarily labor-intensive, is exacerbated when a single ship tows several streamer cables.

There is a need for a simpler module-attachment scheme that preferably can be implemented singlehandedly, rather than by a team of two bodies, to reduce labor costs and to accelerate exploration operations so as to enhance the production of domestic energy resources by accelerating the quest for hydrocarbon reserves.

SUMMARY OF THE INVENTION

A system for attaching a cluster of utility modules to a seismic streamer cable is provided, which system includes a set of two inner races fixedly secured to the streamer cable at preselected locations therealong. Each module of the cluster includes two spaced-apart locking cams. The inner races are separated by the same distance as the spaced-apart locking cams. A set of two hinged latches form outer races. The hinged latches are arranged to be releasably closed externally around the respective inner races. Each hinged latch is characterized by two semi-cylindrical jaws that are joined together on one side by a hinge pin so as to provide an open and a closed configuration. Tongues, which extend from the other side of a first jaw, diametrically opposite to the hinge, are perforated to receive a catch pin. A thumb-latch having side portions and a forward portion, is pivotally mounted in a latch compartment having sidewalls, located on a second jaw diametrically opposite the hinge. The thumb-latch includes a groove in the forward portion for lockingly engaging the catch pin when the jaws are closed with the thumb-latch pivotally moved to a locked position. Means are provided for fastening the hinged latches to the respective modules of the cluster.

In an aspect of this invention, a keyhole-shaped dovetail slot is cut in each one of the first and second jaw members for receiving the locking cams of the respective modules of the cluster to provide fastening means. The slots are aligned along an axis that intersects, at a preselected angle, a line joining the hinge and the latch.

Prehensile retaining nibs, projecting from the respective side portions of the thumb-latch member, frictionally engage corresponding detents in the side walls of the cavity to secure the thumb latch in the locked position.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
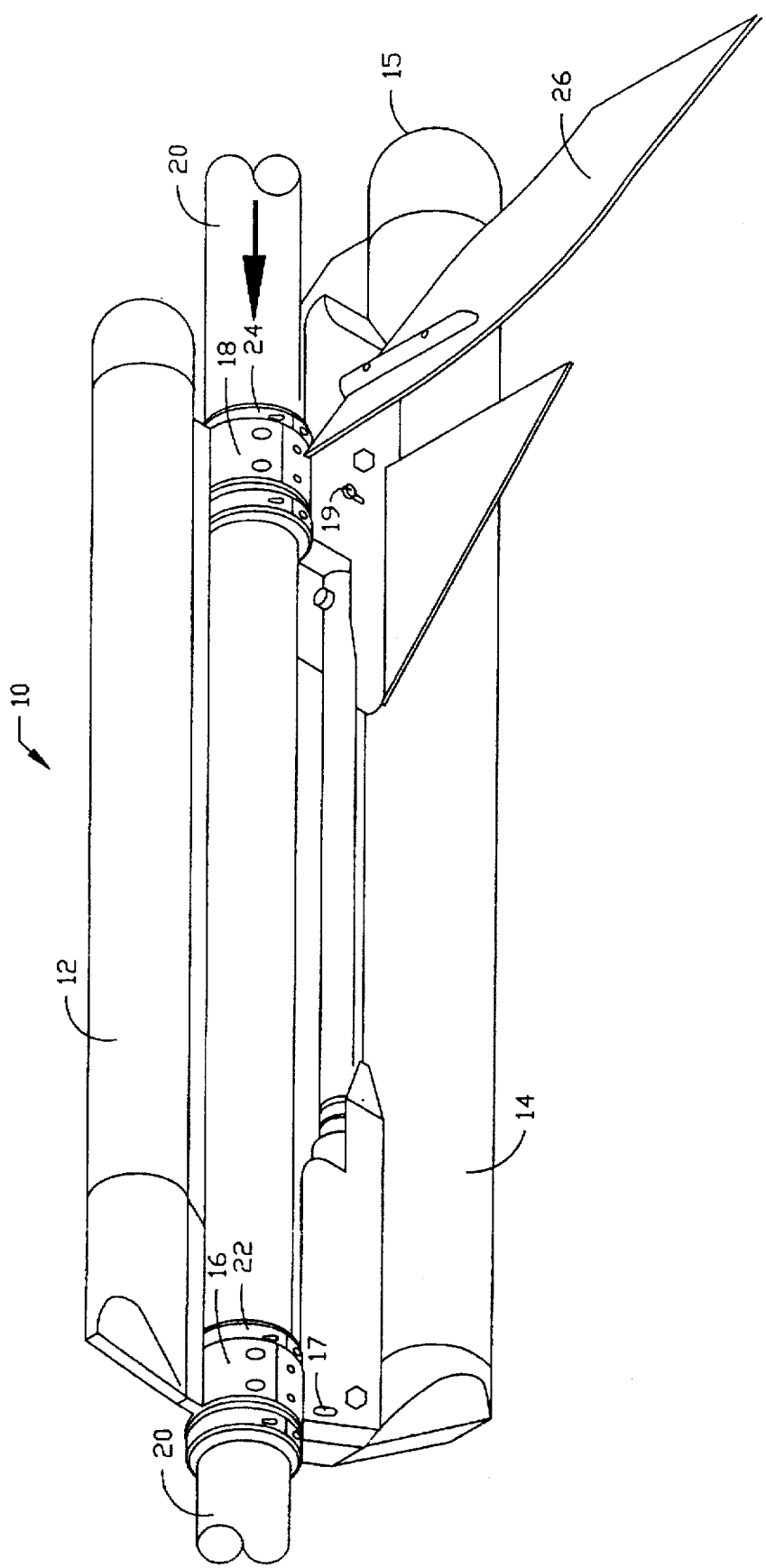
FIG. 1 illustrates certain details of a prior-art utility-module-cluster attachment system.
Figure 2:
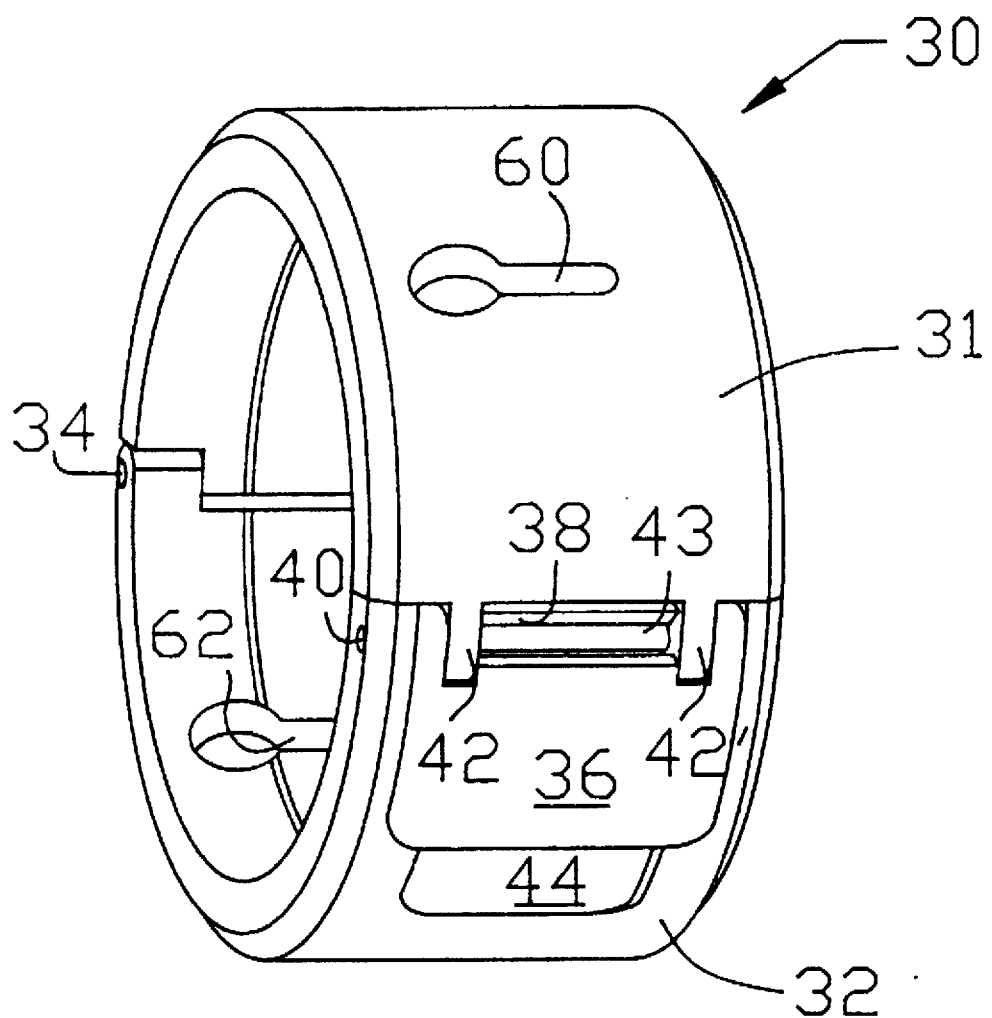
FIG. 2 is an isometric view of the releasable latch member of this invention.
Figure 3:
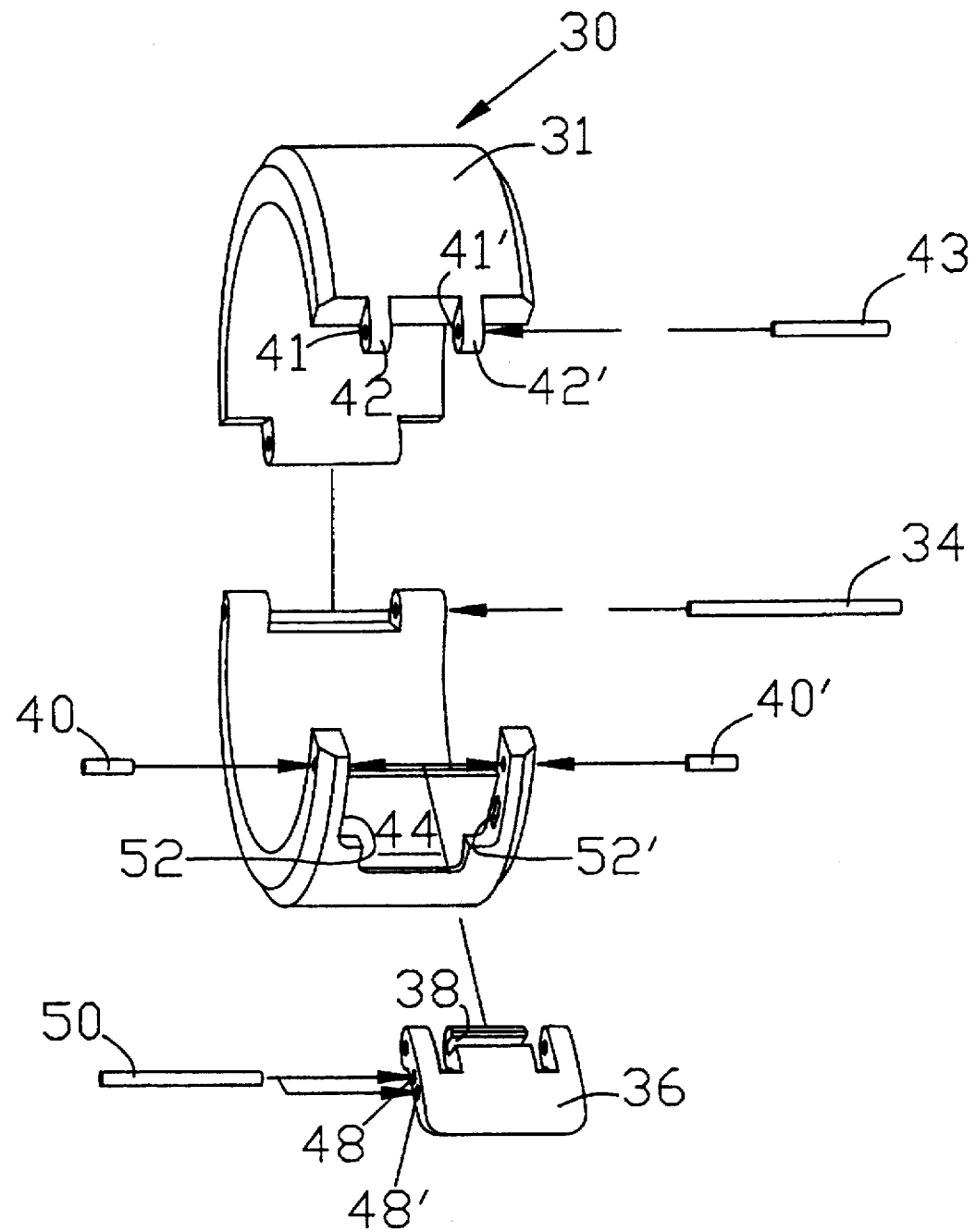
FIG. 3 is an exploded view of FIG. 2 showing the respective parts of the latch member.

With reference to FIGS. 2 and 3 jointly, there are shown the details of construction of a hinged latch, generally shown as 30, that provides a system for attaching a cluster of conventional utility modules such as 12 and 14 of FIG. 1 to a seismic streamer cable 20. Per se, modules 12 and 14, streamer cable 20 and collars 22 and 24 form no part of this invention except in combination with the hinged latch 30.

The structure of hinged latch 30 will be described in detail first with reference to FIGS. 2 and 3 and thereafter their method of employment will be described with respect to FIG. 4.

The hinged latch 30, which may be made of titanium or anodized aluminum, consists of two hinged semi-cylindrical jaws 31 and 32 that are joined by a hinge pin 34 on one side. A thumb latch 36 having a groove 38 cut in its forward face is pivotally mounted on one of the jaws such as 32 diametrically opposite the hinge by means of thumb latch pins 40 and 40'. A pair of tongues 42 and 42', projecting from the other of the jaws such as 31, diametrically opposite hinge pin 34, include perforations for receiving a catch pin 43 therethrough. When jaws 31 and 32 are snapped shut together, they are locked by pushing thumb latch 36 inward into latch compartment 44 whereupon groove 38, in the forward end of latch 36, engages catch pin 43 as shown in FIG. 2.

Two bores, 48 and 48', FIG. 3, each receive a resilient plastic lock pin such as 50. The lock pins are inserted into the bores but protrude a little bit from the sides of the thumb latch to provide prehensile latch-retaining nibs on the sides of thumb latch 36. The nibs may frictionally engage the inner side walls 52 and 52' of latch compartment 44 or detents (not shown) may be provided to receive the prehensile nibs. The latch-retaining nibs fictionally hold thumb latch 36 in the closed position against unwanted accidental release. The forwardmost prehensile nib 48 is positioned such that when the thumb latch is open, it is conveniently but temporarily held in an upright position so as to automatically enmesh catch pin 43 in groove 38 when the jaws 31 and 32 are snapped shut thereby to obviate the need for operator intervention. It is to be observed that the depth of the latch compartment is sufficient so that the surface of the closed thumb latch lies slightly beneath the outer surface of the closed jaws. That configuration serves as an additional safety measure against accidental unlocking by snagging. The pivotally mounted thumb latch, prehensile nibs, catch pin and thumb-latch compartment, taken as a whole in combination, comprise a jaw-latching assembly.

Each of the jaws is provided with a means for fastening a one of the utility modules thereto. The fastening means may take the form of a keyhole-shaped dovetail slots 60 and 62 for receiving the locking cam of a utility module as disclosed in the '339 patent. Preferably, the dovetail slots 60 and 62 are aligned along an axis that intersects an axis formed by a line joining the hinge pin 34 and latch pins 40 and 41. The angle of intersection of the two axes may be any convenient angle such as 90°. Other, non-releasable fastening means such as bolts may be used if desired.

Figure 4:
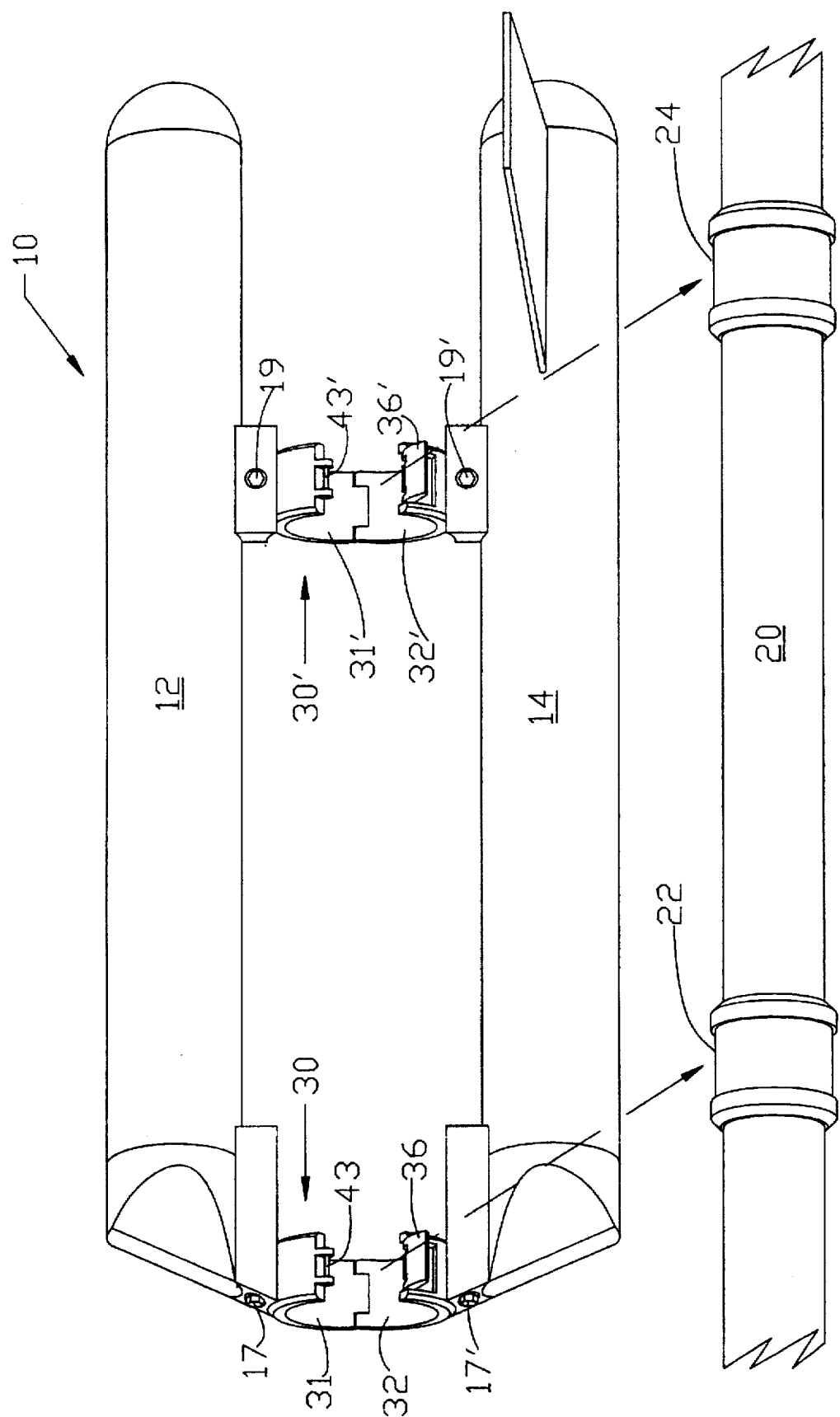
FIG. 4 shows the members of a cluster of utility modules and their method of attachment to a set of two latch members.

FIG. 4 is illustrative of the presently preferred best mode of operation. A cluster 10 of two utility modules including modules 12 and 14 are each provided with two known locking cams 17 and 19. The locking cams are inserted into the appropriate keyhole-shaped dovetail slots 60 and 62 in the jaws of each of two hinged latches 30 and 30'. The slots are clearly shown in FIG. 2 but are hidden from view in FIG. 4. Hinged latches 30 and 30' are preferably left permanently secured to the modules 12 and 14 so that the cluster 10 forms a single hinged, integrated unit.

To install the cluster on a streamer cable such as 20, the cluster 10 is opened up as shown by unlocking and opening the jaws 31, 32, 31' and 32' of hinged latches 30 and 30'. The two hinged latches 30 and 30' are introduced to collars 22 and 24 and thereafter the jaws 31,32, 31' and 32' are closed around collars 22 and 24 and locked shut by pushing thumb latches 36 and 36' inwardly, flush with the outside surface of the closed jaws. Collars 22 and 24 form inner races. Hinged latches 30 and 30' now form outer races or journals which allow free relative rotation between the utility-module cluster and the longitudinal axis of the streamer cable 20.

The cluster may be removed by simply lifting the thumb latch outwardly and opening the jaws. There is no need to disturb the locking cams as was previously required. Because of the convenient integrated design, an operator singlehandedly can install and/or remove the respective clusters to or from a streamer cable independently of his henchmen.

For simplicity, the structure and operation of a single unit has been explained. It is to be understood that in real life 25 to 50 such utility module clusters must be installed on each cable every time that a streamer cable is deployed. In many operations, up to eight separate cables may be towed by one ship. It is evident that any savings in time that can be achieved installing each unit is multiplied many times over during each deployment/retrieval campaign thereby to provide a significant enhancement in the efficiency of energy-resource recovery.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A system for rotatably attaching a cluster of utility modules to a seismic streamer cable, each said module of the cluster including a pair of spaced-apart locking cams, at least one set of two corresponding inner races fixedly secured to the streamer cable at a preselected position therealong, the system comprising:

at least one set of two hinged latches arranged to be releasably closed externally around the respective inner races, each hinged latch being characterized by
i) first and second semi-cylindrical jaws,
ii) a hinge pin for hingedly joining together one side of the first and second jaws thereby to provide the hinged latches with open and closed configurations,
iii) a pair of tongues extending from the side of the first jaw diametrically opposite to the hinge pin,
iv) perforations in said tongues for receiving a catch pin,
v) a thumb-latch member having sides and a forward portion, the thumb-latch member being pivotally mounted in a thumb-latch compartment on the second jaw diametrically opposite said hinge pin, the thumb-latch member having a groove in the forward portion for lockingly engaging the catch pin when the first and second jaws are closed and the thumb-latch member is pivoted to a locked position within said thumb-latch compartment,
vi) a keyhole dovetail slot in each one of the first and second jaws for receiving therein the locking cams of respective ones of the cluster of utility modules.

2. The system as defined by claim 1, comprising:

at least one prehensile nib mounted in a bore on each side of the thumb-latch member for frictionally engaging a sidewall of the thumb-latch compartment for securing said thumb-latch member in the locked position thereby to restrain the thumb-latch member from accidental release.

3. The method of using the system as defined by claim 2 to enhance the production of domestic energy resources by accelerating exploration for hydrocarbon reserves.

4. A system for rotatably mounting a cluster of utility modules to a seismic streamer cable, comprising:

a pair of spaced-apart collars secured to said streamer cable;

a pair of hinged latches, each latch being characterized by two jaws, the jaws being joined at a hinge line on one side by a hinge pin, the jaws having an open position and a closed position in which the jaws are caused to encircle the respective collars with a rotary sliding fit;

a jaw-latching assembly mounted on the side of the jaws diametrically opposite said hinge pin, the jaw-latching assembly including a catch pin mounted on a one of the two jaws, a thumb-latch compartment mounted on the other one of the two jaws and a thumb latch member pivotally mounted in said thumb-latch compartment, said thumb latch member further including a groove for engaging said catch pin thereby to releasably lock the two jaws in the closed position; and means for securing a utility module to each said jaw of the hinged latch.

5. The system as defined by claim 4 comprising:

prehensile nib means associated with the thumb-latch member of the jaw-latching assembly for constraining the thumb latch member of said jaw-latching assembly to retain the jaws of each said hinged latch in the closed position against accidental release.

\* \* \* \* \*